United States Patent
Park

(10) Patent No.: US 12,268,230 B2
(45) Date of Patent: Apr. 8, 2025

(54) METHOD FOR MANUFACTURING INTEGRATED PORRIDGE MADE OF WATER AND NATURAL MATERIALS AND INCLUSION OF ANTI-DIABETES INGREDIENT

(71) Applicant: Deung Byul Park, Suwon (KR)

(72) Inventor: Deung Byul Park, Suwon (KR)

(73) Assignee: Deung Byul Park, Gyeonggi-do (KR)

( * ) Notice: Subject to any disclaimer, the term of this patent is extended or adjusted under 35 U.S.C. 154(b) by 500 days.

(21) Appl. No.: 17/293,022

(22) PCT Filed: Nov. 9, 2019

(86) PCT No.: PCT/KR2019/015213
§ 371 (c)(1),
(2) Date: May 11, 2021

(87) PCT Pub. No.: WO2020/101291
PCT Pub. Date: May 22, 2020

(65) Prior Publication Data
US 2021/0392932 A1    Dec. 23, 2021

(30) Foreign Application Priority Data
Nov. 12, 2018    (KR) .................. 10-2018-0138502

(51) Int. Cl.
*A23L 33/105* (2016.01)
*A23L 7/143* (2016.01)
*A23L 19/00* (2016.01)
*A23L 33/155* (2016.01)
*A23L 33/16* (2016.01)
*A23L 33/175* (2016.01)

(52) U.S. Cl.
CPC ............. *A23L 33/105* (2016.08); *A23L 7/143* (2016.08); *A23L 19/03* (2016.08); *A23L 33/155* (2016.08); *A23L 33/16* (2016.08); *A23L 33/175* (2016.08); *A23V 2002/00* (2013.01)

(58) Field of Classification Search
None
See application file for complete search history.

(56) References Cited

U.S. PATENT DOCUMENTS 6,169,711 B1    1/2001    Koh

FOREIGN PATENT DOCUMENTS

| KR | 1991-0008899 | 10/1991 |
|---|---|---|
| KR | 10-1999-0012408 A | 2/1999 |
| KR | 10-2002-0079065 A | 10/2002 |
| KR | 10-2004-0033500 A | 4/2004 |
| KR | 10-0733787 B1 | 7/2007 |
| KR | 10-0990137 A | 10/2010 |
| KR | 10-2015-0001302 A | 1/2015 |
| KR | 10-1581623 B1 | 12/2015 |
| KR | 10-2017-0132547 A | 12/2017 |
| KR | 10-2018-0083769 A | 7/2018 |
| KR | 10-2019-0005141 A | 1/2019 |

OTHER PUBLICATIONS

KR Office Action dated Jan. 15, 2020 as received in Application No. 10-2018-0138502.
KR Office Action dated Jun. 29, 2020 as received in Application No. 10-2018-0138502.

*Primary Examiner* — Michael V Meller

(57) ABSTRACT

The present invention relates to integrated porridge made of water and natural materials, having a reduced sodium content, and including anti-diabetes ingredients. The integrated porridge is good for the human body because the materials of the integrated porridge make the blood clear and reduce blood glucose levels. Integrated porridge=vegetables+seaweeds+fishes+nuts+meat+miscellaneous grains.

1 Claim, No Drawings

METHOD FOR MANUFACTURING INTEGRATED PORRIDGE MADE OF WATER AND NATURAL MATERIALS AND INCLUSION OF ANTI-DIABETES INGREDIENT

TECHNICAL FIELD

The present invention relates to a method for manufacturing an integrated porridge made of water and natural materials.

The present invention further relates to components of ingredients in an integrated porridge which purifies the blood and lowers a blood sugar level.

BACKGROUND ART

There are a lot of related art documents.
[Patent Document 1] Korean Unexamined Patent Publication Application No. 10-2004-0033500 entitled "Manufacturing method of instant porridge using natural seasoning" on Apr. 28, 2004
[Patent Document 2] Korean Registered Patent No. 10-0733787 entitled "Cereal using meat and manufacturing process of the same" on Jun. 25, 2007
[Other Patent Documents] Korean Registered Patent No. 10-1581623, Korean Unexamined Patent Publication Application No. 10-2018-0083769, Korean Registered Patent No. 10-0990137, Korean Patent Application No. 10-1999-0012408, Korean Registered Patent No. 1991-0008899, and Korean Unexamined Patent Publication Application No. 10-2004-0033500

After a medical examination in May 2018 that showed a fasting blood sugar level of 181, the inventor began to think of ways to put various ingredients in meals to control a blood sugar level and chose porridge as the method of ingestion. During a 100-day project to normalize the blood sugar level, when the inventor exercised and ate porridge, the blood sugar level on a blood sugar level management note was between 148~112, which meant that the 100-day project was a failure. When the inventor started a 200-day project again to normalize the blood sugar level, some changes were made to the porridge on October 23, before reaching the 200 days. As a result, when the inventor found that the fasting blood sugar level dropped below 100, the inventor realized that blood sugar level could be normalized and this accidental discovery led to the opportunity for this invention. The inventor questioned what had happened, but couldn't figure out the answer. The fasting blood sugar level continued to drop to 90 to 99, to 80 to 89, and to an unbelievable level of 75, and was maintained at around 80 to 89. When the inventor first discovered this porridge, it smelled fishy and determined it was not edible. Therefore, the inventor began to improve the porridge, starting with purchasing an electronic scale, measuring the ingredients, recording the recipe, studying ways to get rid of the fishy smell, and getting the taste right. The basic data necessary for the invention was created one by one, the fasting blood sugar level dropped from 181 to 80 to be normal, and a glycated hemoglobin rate was normalized at 5.8. Additionally, the inventor frequently felt fatigue, but the fatigue disappeared, and the blood was less sticky when measuring blood sugar level. When the blood was purified and was not sticky, the body reacted first and the inventor could feel that the body was getting better. The inventor named the porridge, "integrated porridge."

Later, in order to make a better integrated porridge, the inventor made various types of integrated porridge (Rev 1~Rev 5) by looking related books and internet data and by adding better ingredients, but all of them failed. The cause was excessive intake of nutrients and incorrect selection of ingredients, which resulted in the raise of fasting blood sugar level, and thus the porridge had to return to the original version of the integrated porridge. The blood sugar level returned to normal level, and the inventor identified the components of each material, recorded, and stored the data on the computer. The inventor continued to eat the integrated porridge for over one year and experimented, and it wasn't until about a year later that the inventor figured out what ingredients helped in purifying blood and lowering blood sugar level. The inventor set the standard for the amount of ingredients that are put into the integrated porridge, and even found the effects of the invention. Also, the inventor thought that the integrated porridge is something that should be introduced in the future. The above was the background for this invention.

DETAILED DESCRIPTION OF THE INVENTION

Technical Problem

Two technical objects in the technical field are selected, additional technical objects are proposed and proved numerically and technically.

First object. Since the original purpose of the integrated porridge made with water and natural ingredients was to reduce sodium, the amount of sodium in the integrated porridge and the amount in a conventional porridge are compared to provide numerical data showing that the amount of sodium has decreased.

Second object. When the inventor first found out about the integrated porridge, the inventor questioned why it cleared blood and dropped the blood sugar level. Therefore, the object is to prove what ingredients led to clear blood and what ingredients caused the decrease in blood sugar levels to prove that the integrated porridge is a good porridge.

Third object. The standard for one serving of integrated porridge has not been set, so that the inventor decided to set a standard for one serving using the average daily nutrient intake. One serving of conventional porridge includes nutrients that are below the average daily nutrient intake level, so that the inventor tried to provide numerical data to verify and prove that one serving of integrated porridge meets the average standard of daily nutrient intake level.

Fourth object. The integrated porridge should be something anyone could eat. From a book about world food, the inventor discovered a constraint, which was that some people in India do not eat beef. Therefore, the applicant finds and applies substitutions for beef.

The four objects above have been selected because they were considered problematic in everyday life and will be proved numerically and technically.

Technical Solution

Solution for First Object

Because presenting information on ingredients of a third-party's porridge could be recognized to be problematic, the inventor retrieved data on sodium level from 15 porridge products currently released domestically. The recorded data on sodium level from 15 porridge products were 610 mg, 530 mg, 570 mg, 540 mg, 570 mg, 460 mg, 465 mg, 310 mg, 630 mg, 590 mg, 540 mg, 620 mg, 450 mg, 600 mg, 630 mg. The total of 15 data was 8115 mg, an average level was 8,115/15=541 mg, a minimum was 310 mg, and a maximum was 630 mg. The average of sodium was determined as 541 mg to be used as a reference for comparison. The amount of the integrated porridge was between 246 and 364 g, and the data on sodium level retrieved from the nutrition calculation program provided by the National Institute of Agricultural Sciences showed that the minis rum sodium level was 149.5 mg and the maximum was 243.2 mg. The sum of the two value was 149.5+243.2=392.7 mg, and the average was 392.7/2=196.4 mg, which numerically proved that the average sodium level of 196.4 mg in the integrated porridge was lower than the average sodium level of 541 mg of the porridge of the related art. (See Table 3)

Solution for Second Object

There are various ingredients in the integrated porridge that help in cleansing blood. There are lipids and dietary fibers; fucoidan, laminine, and chlorophyll in seaweed and kelp; quercetin in onion; lecithin, saponin, isoflavone in black bean powder; blood-cleansing fibers in brown rice and barley; sasaminol and sesamin in sesame; and combination of allicin and lipids in garlic that help in cleansing blood. As ingredients in the integrated porridge which lower blood sugar levels, protein, amino acids, magnesium, zinc, manganese, vitamin D, and biotin help in lowering the blood level. These components prove that the integrated porridge is good.

Solution for Third Object

In 2015, the Ministry of Health and Welfare released the standard for nutrition intake for Koreans, which was established to promote health of the people and prevent diseases. The published data are recorded in Table 1.

TABLE 1

Daily Energy Consumption Standards for Koreans

| Gender | Age | Energy (kcal/day) Estimated required energy |
|---|---|---|
| Infant | 0 to 5 (months) | 550 |
|  | 6 to 11 | 700 |
| Toddler | 1 to 2 (years old) | 1,000 |
|  | 3 to 5 | 1,400 |
| Male | 6 to 8 (years old) | 1,700 |
|  | 9 to 11 | 2,100 |
|  | 12 to 14 | 2,500 |
|  | 15 to 18 | 2,700 |
|  | 19 to 29 | 2,600 |
|  | 30 to 49 | 2,400 |
|  | 50 to 64 | 2,200 |
|  | 65 to 74 | 2,000 |
|  | Over 75 | 2,000 |
| Female | 6 to 8 (years old) | 1,500 |
|  | 9 to 11 | 1,800 |
|  | 12 to 14 | 2,000 |
|  | 15 to 18 | 2,000 |
|  | 19 to 29 | 2,100 |
|  | 30 to 49 | 1,900 |
|  | 50~64 | 1,800 |
|  | 65 to 74 | 1,600 |
|  | Over 75 | 1,600 |
| Pregnant Woman | $1^{st}$ Trimester | +0 |
|  | $2^{nd}$ Trimester | +340 |
|  | $3^{rd}$ Trimester | +450 |
| Lactating Woman |  | +320 |

The sum and the average of 9 values for male is 20200/9=2244 kcal, and the sum and the average of 9 values for female is 16300/9=1,811 vkcal. According to the data from the internet, the average daily calorie intake from snacks for male is 500 kcal and for female is 400 kcal. A value obtained by subtracting this value from the average value for male and female is 2,244−500=1,744 kcal for male and 1,811−400=1,411 kcal for female. The total calorie for male and female is 1,7444+1,411=3,115 kcal, and the average is 3,155/2=1,578 kcal. This is set as the average calorie, and with an allowable error of 20%, the minimum is 1,262 kcal and maximum is 1,894 kcal. Since this is the daily average calorie, if the value is changed into a calorie for one meal, the minimum value is 1,262/3=421 kcal, and maximum is 1,894/3=631 kcal. Therefore, the average range of nutrients per meal is between 421 and 631 kcal, so that this value is applied as an average nutrient per meal. Because presenting information on ingredients of a third-party's porridge could be recognized to be problematic, the data on calorie is retrieved from 15 porridge products currently released domestically and only the minimum and maximum values are recorded.

Company A's porridge product is 130 to 200 kcal hick falls short of the average nutrient per meal.

Company B's porridge product is 150 to 315 kcal, which falls short of the average nutrient per meal.

Company C's porridge product is 155 to 315 kcal, which falls short of the average nutrient per meal.

The average standard range of nutrients for one meal is 421 to 631 kcal, and the products from companies A, B, and C all proved numerically that they were below the average standard. The data from the calculation program provided by the National Institute of Agricultural Sciences and the data on Table 3 proved that the calorie of the integrated porridge is between 421.9 to 615.8 kcal which satisfies the average value of nutrients for one meal, so that the third object was proved.

Solution for Fourth Object

The porridge needs to be taken by anyone. However, some people in India don't eat beef, and it was necessary to find substitutions that were equivalent to beef. Ingredient composition analysis data which is found based on the ingredient composition analysis data provided by the National Institute of Agricultural Sciences is presented and the data which is selected as the equivalent is presented in Table 2. The reason to select the equivalent will be described based thereon.

TABLE 2

| Ingredient | Based on 100 g of beef | Based on 100 g of goat meat | Unit |
|---|---|---|---|
| Energy | 177 | 178 | kcal |
| Water Content | 69.44 | 64.6 | g |
| Protein | 20.07 | 19.88 | g |
| Lipid | 10.07 | 10.31 | g |
| Serving | 0.96 | 0.99 | g |
| Total Amino Acid | 19201 | 17862 | mg |
| Essential Amino Acid | 9615 | 8533 | mg |
| Lysin | 1654 | 1642 | mg |
| Total Fatty Acid | 9.23 | 8.01 | g |
| Magnesium | 43 | 21 | mg |
| Zinc | 2.01 | 4.59 | mg |
| Manganese | 0.013 | 0.008 | mg |
| Sodium | 98 | 70 | mg |
| Folic Acid | 3 | 18 | µg |

Here, the important components were energy, protein, and lipid. Compared to beef, energy was 100.6%, protein was 99.1%, and lipid was 102.4% for goat meat, and therefore beef and goat meats were determined as equivalents, so that the fourth object was proved.

To record additional supplemental data, it is suggested that the data from a nutritional value calculation program provided by the National Institute of Agricultural Sciences be used to select correct ingredients. However, in the case where there is no data, like for multigrains, a slight error may occur as the data of closest ingredients was used. The system data was implemented by using the most accurate data.

TABLE 3

Result data that is obtained by putting a minimum amount of ingredients (246 g) and a maximum amount of ingredients (364 g) in the integrated porridge

| Ingredient | Minimum amount of ingredients 246 g | Maximum amount of ingredients 364 g | Unit |
|---|---|---|---|
| Energy | 421.9 | 615.8 | Kcal |
| Water Content | 142.5 | 213.6 | |
| Protein | 22.6 | 33.6 | g |
| Lipid | 8.8 | 12.8 | g |
| Ash | 4 | 6.4 | |
| Carbohydrate | 67.2 | 98.8 | g |
| Total Sugars | 5.6 | 8.4 | |
| Total Fiber | 10.5 | 15.8 | g |
| Total Amino Acid | 17150.3 | 25351.6 | |
| Essential Amino Acid | 8121.3 | 11986 | |
| Total Fatty Acid | 8.2 | 12 | |
| Total essential Fatty Acid | 2.6 | 3.8 | |
| Calcium | 112.7 | 158.3 | mg |
| Iron | 2.9 | 4.3 | mg |
| Magnesium | 116.4 | 168.1 | mg |
| Phosphorus | 408.5 | 597.4 | mg |
| Potassium | 1024.3 | 1608.4 | mg |
| Sodium | 149.5 | 243.2 | mg |
| Zinc | 3.2 | 4.7 | mg |
| Copper | 0.4 | 0.5 | mg |
| Manganese | 1.8 | 2.5 | mg |
| Selenium | 27.8 | 41.2 | µg |
| Molybdenum | 67.8 | 97.7 | µg |
| Iodine | 10.9 | 15.3 | µg |
| Retinol | 0.8 | 1.2 | µg RAE |
| Beta-carotene | 1518.5 | 2283.3 | |
| Vitamin D | 1.6 | 2.4 | |
| Vitamin E | 3.9 | 5.6 | mg |
| Vitamin K1 | 8.4 | 12.6 | µg |
| Vitamin B1 | 0.3 | 0.4 | mg |
| Vitamin B2 | 0.4 | 0.6 | mg |
| Niacin (NE) | 0.7 | 1.2 | |
| Vitamin B6 | 0.1 | 0.2 | mg |
| Biotin | 42.4 | 61.4 | µg |
| Folic Acid (DFE) | 107.8 | 160.8 | µg |
| Vitamin B12 | 1.3 | 1.8 | µg |
| Vitamin C | 26.4 | 39.9 | mg |
| Vitamin K | 8.2 | 12.2 | |
| Cholesterol | 25.4 | 35.6 | g |

Books and Internet sources state widely known effects of the ingredients.

Proteins and amino acids are combined to act as insulin to lower the blood sugar levels, amino acids control the blood sugar level, magnesium control diabetes, zinc lowers the blood sugar level, manganese controls diabetes, selenium helps with care of eyes and preventing complications of diabetes, and vitamin D is related to diabetes. Vitamin E is good for eye health and has antioxidant properties, and niacin has a vasodilating function to prevent diabetes. Biotin has a function to improve diabetes, folic acid prevents vascular diseases, vitamin B12 helps in purifying blood and recovering from fatigue. These components help in lowering blood sugar level, and the information is presented as supplementary data.

Advantageous Effects

The amount of sodium in conventional porridge is 541 mg, and the amount of sodium in the integrated porridge is reduced to 196.4 mg. Therefore, the sodium content of the integrated porridge is low so that it is effective to consume less sodium.

Korean's average daily nutrient intake level is 421 to 631 kcal and the average daily nutrient intake level for the integrated porridge is 421.9 to 615.8 kcal, which is within the range, compared to the average daily nutrient intake level for conventional porridge of 130~315 kcal, which is below the standard. The integrated porridge is effective in meeting Korean's average daily nutrient intake level, and solves the problem of calorie shortage from the current conventional porridge products.

The existing conventional porridge is for one meal. The integrated porridge is not only available for one meal, but it is also effective in clearing blood and lowering the blood sugar level so that it is intended to help those suffering with blood sugar level problems.

The integrated porridge selects goat meat as a beef equivalent to allow anyone to take it, so that it is globalized to be consumed even in India, and be taken by anyone.

To give additional brief explanation of the effect of this invention, it will clean blood, give various benefits to the body, and lower the blood sugar level, so that the invention of the integrated porridge will be very useful to people. However, there should be caution for excess consumption as past experiences showed that too much ingredients or too much consumption could cause blood sugar level to rise instead.

BEST MODE

In the following description, "mixture 1" refers to vegetables, seaweed, fish, and meat, and "mixture 2" refers to nuts and grains. Vegetables refer to minced garlic, onions, carrot, zucchini, shiitake mushroom, cabbage, spinach, paprika, and ground sesame. Seaweed refers to powdered seaweed and kelp. Fish refers to tuna and anchovy, and anchovy is powdered. Meat refers to beef and goat meat. Nuts refer to powdered peanuts and black bean. Grain refers to brown rice, barley, oat, and black bean. Here, the integrated porridge consists of 50% of vegetables, 2% of seaweed, 8.5% of fish, 8.2% of meat, 3.3% of nuts, and 28% of grains. With an allowable error of 20%, the ingredients range is set as 40 to 60% for vegetable, 1.6 to 2.4% for seaweed, 6.8 to 10.2% for fish, 6.6 to 9.8% for meat, 2.6 to 4% for nuts, and 22.4 to 33.6% for grains.

In order to carry out the invention, a preparing process and a manufacturing process are necessary. Important information for the process of preparing ingredients is provided and information for being careful not to lose contents of the ingredients is provided. Hereinafter, a process of preparing and manufacturing an integrated porridge will be described.

Here, the ingredients without restrictions on size are onions, spinach, and cabbage. The size of these three ingredients were restricted but there were cases in which the size limit was exceeded, so that the size of the above three ingredients will not be restricted. The meaning of cutting into small pieces used below refers to cutting the ingredients into sizes that are suitable for eating, like 0.2 to 1 cm size, and the size is limited to 2 cm.

Preparation of Ingredients 1. Kelp powder, seaweed powder, and anchovy powder are mixed at a ratio of 2:2:1 or 3:3:1 to make natural seasoning. (3:3:1 is recommended because of the components of ingredients)

Preparation of Ingredients 2. Canned tuna has fishy taste, so that the tuna broth is removed, the tuna is put in a frying pan and stir-fried over medium or low heat for about 5 minutes to remove the fishy smell as much as possible.

Preparation of ingredients 3. Water and beef (goat meat) are added in a bucket, the blood is drained 3 or 4 times every 3 to 4 minutes, and the meat is squeezed to remove any blood left over running water. The beef is cut into small pieces with 0.2 to 1 cm to remove grease, and the beef is stir-fried in a pan over low heat. When the beef is stir-fried, water and impurities will come out. At this time, the frying pan is tilted at an angle of 30 to 45 degrees to remove the impurities with a spoon. Continue cooking the beef until it is half or fully cooked, but the beef should not be burned.

Preparation of ingredient 4. Multigrain rice, which includes brown rice, barley, oat, and black bean is prepared in advance.

Preparation of ingredient 5. Prepare black bean powder.

Preparation of ingredient 6. Prepare peanut powder.

Preparation of ingredient 7. Garlic may be raw or frozen, but the garlic is ground in advance.

Preparation of ingredient 8. Cut carrots into small pieces of 0.2 to 1 cm.

Preparation of ingredient 9. Cut onions into small pieces of 0.2 to 1 cm.

Preparation of ingredient 10. Cut zucchini into small pieces of 0.2 to 1 cm.

Preparation of ingredient 11. Cut dried shiitake mushroom into small pieces of 0.2 to 1 cm using scissors.

Preparation of ingredient 12. Cut cabbage into small pieces of 0.2 to 1 cm.

Preparation of ingredient 13. Cut the root part of the spinach, separate it, and wash it with water 3~4 times to remove sand. Put water in the pot, heat it, and blanch the spinach in the water heated between 30 and 45° C. for about 1 to 2 minutes. Wash the blanched spinach in cold water and remove the water to prepare the spinach.

Preparation of ingredient 14. Cut raw paprika into small pieces of 0.2 to 1 cm.

Preparation of ingredient 2. Prepare ground sesame seeds for good absorption by the human body.

All the preparing processes end.

MODE FOR CARRYING OUT THE INVENTION

The manufacturing process of cooking one serving of integrated porridge will be described below.

A total weight of ingredients, excluding water, is 246 to 364 g. The following ingredients are put in a pot: 5.6 to 8.4 g of natural seasoning, 20 to 30 g of tuna, 20 to 30 g of beef (goat meat), 70 to 100 g of multigrain rice, 4 to 6 g of black bean powder, 4 to 6 g of peanut powder, 3.2 to 4.8 g of minced garlic, 20 to 30 g of carrots, 20 to 30 g of onion, 20 to 30 g of zucchini, 6.4 to 9.6 g of shiitake mushroom, 20 to 30 g of cabbage, and 600 to 700 cc of water. The amount of water is appropriately adjusted with the naked eye. Then, turn on the heat, heat the mixture for about 10 to 20 minutes over medium heat, turn off the heat when fully cooked, stir it every 3 to 5 minutes, and put the finished porridge in a bowl. Immediately before eating, 20 to 30 g of spinach, 12 to 18 g of paprika, and 0.8 to 1.2 g of ground sesame are added, and the process of making the integrated porridge is finished.

The amount (g) of ingredients for the integrated porridge described above has been set based on the average daily nutrient intake level, so that if the range of the ingredients for the integrated porridge is arbitrarily reduced, the average daily nutrient intake level is not met, and if the range of the ingredients for the integrated porridge is arbitrarily increased, the average daily nutrient intake level is exceeded. The selection process of ingredients will be described and the reason and the ground will be explained. First, the 2015 standard for nutrition intake for Koreans has been considered to set the standard for one serving at 421 to 631 kcal, and the amount of ingredients has been adjusted and selected using the nutritional value program. Second, taste and color are used for the choice. Third, the amount of ingredients is selected based on the existing integrated porridge with a ratio of 7:3. Here, 7 is the ratio of mixture 1, and 3 is the ratio of mixture 2.

Ratio of natural seasoning made by mixing kelp powder, seaweed powder, and anchovy powder. 5.6 to 8.4 g of natural seasoning. See Table 4

TABLE 4

| Kelp Powder (g) | Seaweed Powder (g) | Anchovy Powder (g) | Test Results (one serving) |
|---|---|---|---|
| 1 | 1 | 1 | Kelp and seaweed don't taste good. Eliminated from choice |
| 2 | 2 | 1 | Natural seasoning, selected for use |
| 3 | 3 | 1 | Natural seasoning, selected for use |
| 4 | 4 | 1 | Color of porridge changed green, Eliminated from choice |
| 2 | 2 | 2 | Tastes salty, Eliminated from choice |
| 2 | 2 | 3 | Too salty, Eliminated from choice |
| 3 | 3 | 2 | Tastes salty, Eliminated from choice |

The ratio for natural seasoning is decided as 2:2:1 and 3:3:1. The overall ratio is changed based on the average daily nutrient intake standard, 7 g is selected for use. An allowable error is applied to be determined as 5.6 to 8.4 g.

20 to 30 g of tuna, 20 to 30 g of beef. See Table 5

TABLE 5

| Tuna (g) | Beef (g) | Test Results (1 serving) |
|---|---|---|
| 10 | 10 | Couldn't taste flavor of ingredients, Eliminated from choice |
| 20 | 20 | Could taste flavor of ingredients, selected for use |
| 30 | 30 | Could taste flavor of ingredients, selected for use |

The average daily nutrient intake standard is applied to set the composition ratio of the ingredients as 7:3 ratio. 20 g and 30 g are selected for use based on the flavor of food, and the median value of 25 g is determined. An allowable error is applied to be determined as 20 to 30 g.

70 to 100 g of multigrain rice, 4 to 6 g of black bean powder, 4 to 6 g of peanut powder. See Table 6.

TABLE 6

| Multigrain Rice (g) | Black Bean Powder (g) | Peanut Powder (g) | Test Results (one serving) |
|---|---|---|---|
| 70 to 100 | 9 to 10 | 9 to 10 | Gas is generated in the body. Eliminated from choice |
| 70 to 100 | 7 to 8 | 7 to 8 | Gas is generated in the body. Eliminated from choice |
| 70 to 100 | 4 to 6 | 4 to 6 | Gas is not generated in the body. Selected for use |

The unit for multigrain rice was changed to 10, and 70~100 g is determined selected for use by applying the average daily nutrient intake level. 4 to 6 g of black bean powder and peanut powder are selected so as not to generate gas. A median value of 5 g is selected and an allowable error is applied thereto to be determined as 4 to 6 g.

3.2 to 4.8 g of minced garlic. See Table 7

TABLE 7

| Minced Garlic (g) | Test Results (1 serving) |
|---|---|
| 1 to 2 | Amount of garlic is insufficient for amount of porridge. Eliminated from choice |
| 3 to 4 | Amount of garlic is just right for the amount of porridge. Selected for use |

It is first intended to choose 1 or 2 pieces of garlic. However, since some garlic sizes are small and the other sizes are big and the deviation of one piece is big, minced garlic weighed in grams is selected instead. 3 to 4 g of minced garlic is chosen, and 4 g is the final decision and an allowable error is applied thereto to be determined as 3.2 to 4.8 g.

20 to 30 g of carrot, 20 to 30 g of onion, 20 to 30 g of zucchini, and 20 to 30 of cabbage. See Table 8

TABLE 8

| Carrot (g) | Onion (g) | Zucchini (g) | Cabbage (g) | Test Results (one serving) |
|---|---|---|---|---|
| 10 | 10 | 10 | 10 | Vegetables do not taste good. Eliminated from choice |
| 20 | 20 | 20 | 20 | Taste of vegetables is just right. Selected to use |
| 30 | 30 | 30 | 30 | Taste of vegetables is just right. Selected to use |

The taste of vegetables is just right to select 20 g and 30 g of vegetable by means of the experiment and the median value of 25 g is selected to be used. An allowable error is applied thereto to be determined as 20 to 30 g.

6.4 g to 9.6 g of shiitake mushroom. See Table 9

TABLE 9

| Shiitake Mushroom (g) | Test Results (1 serving) |
|---|---|
| 16 to 20 | Too much mushroom, makes taste disgusting. Eliminated from choice |
| 11 to 15 | Too much mushroom, makes taste disgusting. Eliminated from choice |
| 5 to 10 | Amount of mushroom is just right. Selected to use |

5~10 g of mushroom is chosen as an appropriate amount and 8 g of the median value is determined. Allowable error is applied to be determined as 6.4 to 9.6 g.

600 to 700 cc of water 600~700 cc. See Table 10

TABLE 10

| Water (cc) | Test Results (one serving) |
|---|---|
| 500 | When cook is performed with the ingredients, there is no water and ingredients burn when cooked. Eliminated from choice |
| 600 | Water is visible after cooking with ingredients. Selected for use |
| 700 | Water is visible after cooking with ingredients. Selected for use |

Since some of the ingredients such as mushrooms, seaweed, and kelp absorb water and water evaporate during cooking, the amount of water used needs to be adjusted as needed. 600~700 cc of water is selected to be used.

20 to 30 g of spinach, 12 to 18 g of paprika, 0.8 to 1.2 g of ground sesame. See Tables 11 and 12

TABLE 11

| Spinach (g) | Paprika (g) | Test Results (1 serving) |
|---|---|---|
| 10 | 1 to 10 | Not enough to eat. Eliminated from choice |
| 20 | 11 to 20 | Enough to eat. Selected to use |
| 30 | 21 to 30 | Enough to eat. Selected to use |

TABLE 12

| Ground Sesame (g) | Test Results (one serving) |
|---|---|
| 1 | Enough to eat. Selected to use |
| 2 | Enough to eat. Could be used |
| 3 | Enough to eat. Could be used |

20 g and 30 g of spinach is selected to be used, so the median value of 25 g is chosen for use and an allowable error is applied thereto to be determined as 20 to 30 g. 11 to 30 g of paprika is available, 15 g is chosen for use and an allowable error is applied thereto to be determined as 12 to 18 g. 1 g, 2 g, and 3 g of minced sesame are all available, but 1 g is selected to be used and an allowable error is applied thereto to be determined as 0.8 to 1.2 g.

The description of the selection of ingredients for integrated porridge ends.

INDUSTRIAL APPLICABILITY

The integrated porridge may be manufactured in an existing porridge production facility and has industrial applicability.

The invention claimed is:
1. A method of making an integrated porridge comprising water, tuna, beef, goat, seaweed powder, kelp powder, anchovy powder, minced garlic, carrot, onion, zucchini, shiitake mushroom, cabbage, spinach, paprika, ground sesame, brown rice, barley, cat, black bean, black bean powder, and peanut powder.

* * * * *